UNITED STATES PATENT OFFICE.

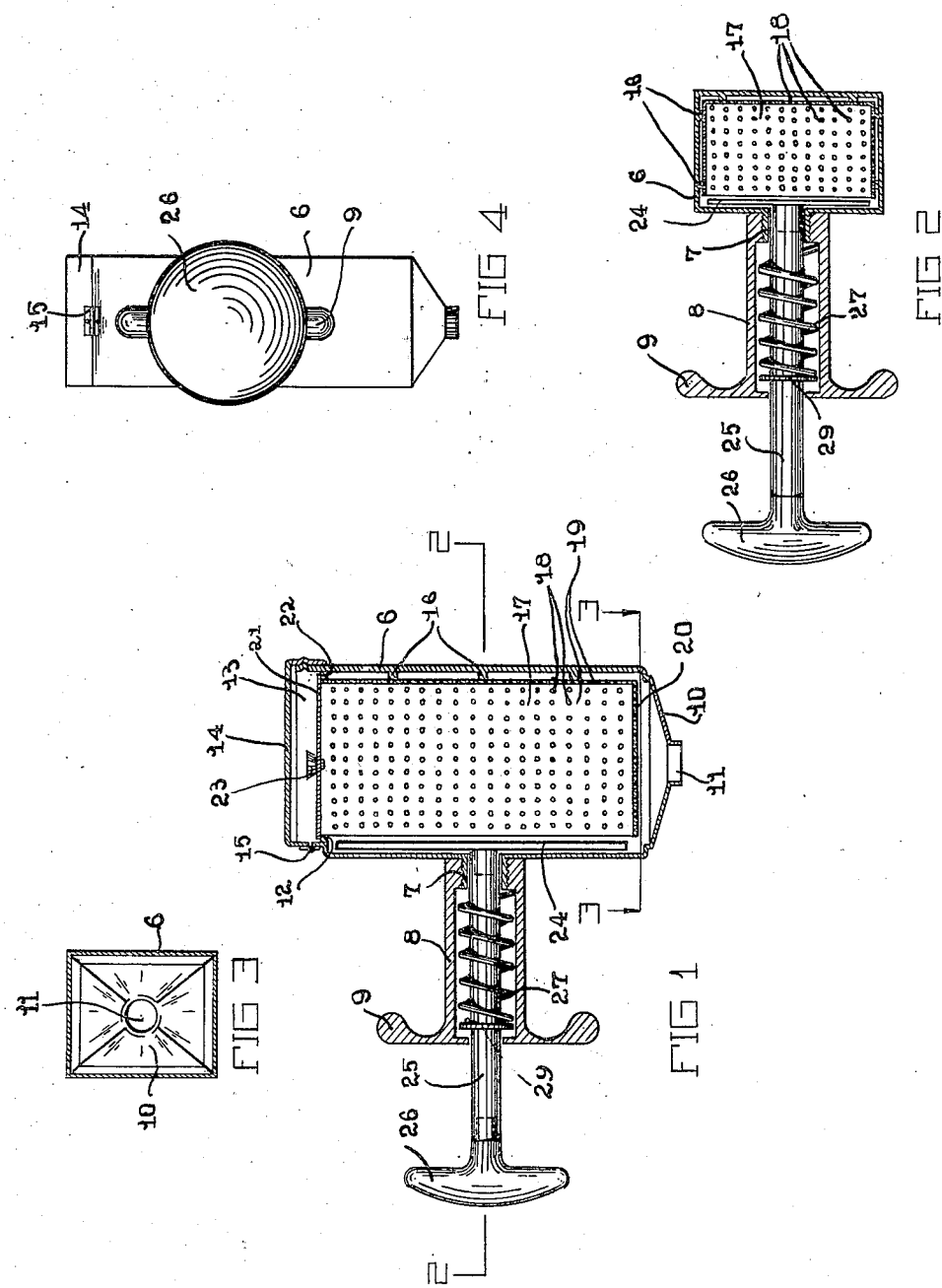

WILLIAM E. GRAY, OF CHICAGO, ILLINOIS.

LEMON SQUEEZER.

1,422,196. Specification of Letters Patent. Patented July 11, 1922.

Application filed November 13, 1920. Serial No. 423,769.

*To all whom it may concern:*

Be it known that I, WILLIAM E. GRAY, a citizen of the United States, and a resident of the city of Chicago, county of Cook, and State of Illinois, have invented certain new and useful Improvements in a Lemon Squeezer, of which the following is a specification.

My invention relates to new and useful improvements in lemon squeezers, and has for its object the provision of a lemon squeezer suitable for individual use at the table.

It is often desirable to serve a slice or a portion of lemon, or similar acid fruit, with fish and other edibles at the table. In squeezing the juice from such slice or portion of fruit onto the edibles, a part of such juice frequently finds its way onto the table covering and onto the diner's garments. Some of the juice also adheres to the fingers. It is this undesirable occurance that applicant wishes to overcome, and for the purpose of obviating same he has designed his particular lemon squeezer; it being his intention that a separate one be served to each guest.

An illustrated embodiment of the invention is shown in the accompanying drawings:

Fig. 1 is a vertical sectional view of the device;

Fig. 2 is a horizontal section on the line 2—2, Fig. 1;

Fig. 3 is a section on line 3—3, Fig. 1, showing an inner view of the discharge end of the device; and, Fig. 4 is an end elevation.

The lemon squeezer comprises a main casing 6 with an integral collar 7 and a sleeve 8 threaded to said collar, said sleeve being provided with extensions 9 for engagement by the fingers. The main casing 6 is provided at one end with an integral bottom 10 having an outlet 11, the case is provided at the other end with an interior circular flange 12 and a collar 13 extending beyond said flange, to which a cap 14 is connected by means of a hinge 15. Suitable closing means consisting of a depression and a nose is provided on said cap and casing. The casing is further provided on its interior with lugs 16, which support a container or cartridge 17, having perforations 18 in its three sides 19 and bottom 20 thereof. The top 21 of said container extends beyond the sides 19, and the extensions 22 engage the circular flange 13 in the casing to form a closure and retain the juice in the lower end of said casing. A knob 23 is fastened to the top 21 as a means by which to withdraw the cartridge from the casing. A plunger plate 24 is located in the casing adjacent the open side of the cartridge, and is connected to a stem 25, which extends through the collar 7 and the sleeve 8, and has a thumb knob 26 attached to the outer end. A spring 27 surrounds the stem and bears with one end against the inner end of the collar 8 and with the other end against a washer 29 fastened to the stem. This spring means serves to withdraw the plate 24 from the cartridge and retain it close to the side of the casing.

In operation, the cartridge or container is removed from the casing, a slice or a portion of lemon or, any similar fruit is placed in the cartridge, which is then inserted in the casing, and the cap closed. The extensions 9 are then engaged by two of the fingers, the knob 26 is engaged by the thumb and the plunger plate 24 is pressed inwards extracting the juice from the contained fruit forcing same through the perforations 18, and as the case is held with the end 10 downwards, the juice is discharged through the lower opening 11 in the casing upon the food upon which the juice is desired.

It is thus evident that I have designed an improved lemon squeezer adapted to be used by the guests individually at the table and which obviates the difficulties above set forth.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent is:

1. In a device of the class described, a casing containing a perforated container having an open side, a pressure plate in said casing adapted to enter said open side, and thumb means to operate said pressure plate.

2. In a device of the class described, a casing enclosing a removable container having an open side, pressure means in said casing adapted to operate through said open side, and means extending through the casing to actuate said pressure means.

3. In a device of the class described, a casing containing a perforated container having an open side, pressure means in said casing adapted to enter said open side, means protruding from said casing to operate said pressure means, and a spring to retract said pressure means from said container.

4. In a device of the class described, a main casing having a single openable top, a perforated container adapted to be removably inserted through said top, and pressure means adapted to enter said container in said casing.

5. A lemon squeezer comprising a casing, a perforated container in said casing adapted to hold a portion of fruit, a pressure plate in said casing adapted to enter said container and extract juice from said fruit, and a slidably mounted operating stem connected to said plate and protruding from the casing.

6. A lemon squeezer comprising, in combination, a casing, a removable perforated container in said casing adapted to contain a portion of lemon, a plunger plate mounted in the side of said casing adapted to operate in said container and extract juice from said lemon portion, and an opening in the bottom of said casing for discharging the extracted juice.

7. In a device of the class described, a main casing having an openable cap-like top, a perforated container readily insertable and removable through said top, and pressure means mounted in said casing adapted to be pressed into said container.

In testimony whereof I have signed my name to this specification in the presence of two subscribing witnesses.

WILLIAM E. GRAY.

Witnesses:
JOSHUA R. H. POTTS,
B. G. RICHARDS.